(12) United States Patent
Siddiqui et al.

(10) Patent No.: US 11,859,132 B2
(45) Date of Patent: Jan. 2, 2024

(54) PROCESS AND AN APPARATUS FOR CONVERSION OF WASTE PLASTIC PYROLYSIS OIL INTO VALUABLE PRODUCTS

(71) Applicant: Indian Oil Corporation Limited, Mumbai (IN)

(72) Inventors: Shahil Siddiqui, Faridabad (IN); Ponoly Ramachandran Pradeep, Faridabad (IN); Vijayan Kanattukara Bineesh, Faridabad (IN); Satyen Kumar Das, Faridabad (IN); Madhusudan Sau, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 0 days.

(21) Appl. No.: 17/816,951

(22) Filed: Aug. 2, 2022

(65) Prior Publication Data
US 2023/0047205 A1 Feb. 16, 2023

(30) Foreign Application Priority Data
Aug. 5, 2021 (IN) .............................. 202121035419

(51) Int. Cl.
| | | |
|---|---|---|
| C10G 1/10 | (2006.01) | |
| C10G 1/00 | (2006.01) | |
| C10G 7/04 | (2006.01) | |
| C10G 9/00 | (2006.01) | |

(52) U.S. Cl.
CPC ............... *C10G 1/002* (2013.01); *C10G 1/10* (2013.01); *C10G 7/04* (2013.01); *C10G 9/005* (2013.01); *C10G 9/007* (2013.01); *C10G 2300/1003* (2013.01); *C10G 2300/301* (2013.01); *C10G 2300/4006* (2013.01); *C10G 2300/4012* (2013.01); *C10G 2300/708* (2013.01); *C10G 2400/20* (2013.01)

(58) Field of Classification Search
CPC .......... C10G 1/002; C10G 1/10; C10G 9/005; C10G 9/007; C10G 2300/1003; C10G 2400/20
See application file for complete search history.

(56) References Cited

U.S. PATENT DOCUMENTS

| | | | | |
|---|---|---|---|---|
| 4,118,281 | A | * | 10/1978 | Yan .......................... C10B 57/04 521/49 |
| 8,344,195 | B2 | | 1/2013 | Srinakruang |
| 2015/0152334 | A1 | | 6/2015 | Thakur et al. |
| 2016/0264885 | A1 | | 9/2016 | Narayanaswamy et al. |
| 2019/0233744 | A1 | | 8/2019 | Narayanaswamy et al. |
| 2020/0017773 | A1 | | 1/2020 | Ramamurthy et al. |
| 2021/0087473 | A1 | * | 3/2021 | Pradeep ................... C10G 1/10 |
| 2022/0169928 | A1 | * | 6/2022 | Xu ........................... C10B 55/10 |

FOREIGN PATENT DOCUMENTS

WO      0105908 A1     1/2001

* cited by examiner

*Primary Examiner* — Randy Boyer
(74) *Attorney, Agent, or Firm* — Workman Nydegger

(57) ABSTRACT

The present invention discloses a process and an apparatus for conversion of waste plastic pyrolysis oil into value added products, wherein, the pyrolysis oil is produced from waste plastics by utilizing HCGO as a preheating stream. The process and apparatus as disclosed improves the conventional DCU process in terms of liquid, gaseous yields and reduction in coke yields and without disturbing the hardware of the conventional process along with energy efficient production of pyrolysis oil. The present process and apparatus include a delayed coking process and a system for the delayed coking process which involves the integration of delayed coking system with pyrolysis section and utilization of produced pyrolysis oil by co-processing it with residual heavy hydrocarbon feedstock.

13 Claims, 6 Drawing Sheets

PROCESS AND AN APPARATUS FOR CONVERSION OF WASTE PLASTIC PYROLYSIS OIL INTO VALUABLE PRODUCTS

FIELD OF THE INVENTION

The present disclosure related to a process and an apparatus for conversion of waste plastic pyrolysis oil into valuable products. Specifically, the present disclosure provides integration of a delayed coking system with a pyrolysis oil production system, wherein, the heavy coker gas oil (HCGO) is utilized as heat integrating stream for preheating the waste plastics up to its melting temperature thereby reducing heat requirements.

BACKGROUND OF THE INVENTION

Polymer waste disposal is a grave environmental concern and single use waste plastic is a major contributor towards environmental pollution. Further, conventional processes and apparatus requires high energy for converting waste plastic into other reusable products.

US2016/0264885A1 discloses processing of pyrolysis oil from waste plastic by using processes such as dichlorination of chloride compounds, olefin hydrogenation, hydrocracking heavy hydrocarbon molecules and steam cracking of hydroprocessed light gas stream to produce high value petrochemical products. US2020/0017773A1 discloses conversion of pyrolysis oil from waste plastics to high value products such as benzene and xylene by using processes such as pyrolysis, hydroprocessing, reforming and disproportionation.

US2019/0233744A1 discloses a process for production of polypropylenes from waste plastics feedstocks by processes such as hydrotreating, steam cracking, separation and polymerization. U.S. Pat. No. 8,344,195B2 discloses a process for producing naphtha and gas oil by catalytic cracking of a plastics derived liquid, which is obtained from a pyrolysis process, using a very low-cost catalyst under low temperature and pressure conditions. WO2001/005908A1 discloses a process for producing low-boiling point hydrocarbons from waste plastics and heavy oil, and more particularly to a process for producing gasoline and diesel through pyrolysis and catalytic cracking of waste plastics and heavy oil.

US2016/0264885A1 & US2020/0017773A1 discloses the treatment of hydrocarbon streams obtained from pyrolysis of waste plastics for utilizing it in the downstream processes. It consists of hydrotreating for sulfur removal and olefin saturation, dichlorination for chloride removal, hydrocracking for breaking large molecules to smaller ones and separating the stream which is suitable for steam cracking and reforming to produce high value petrochemicals such ethylene, propylene, benzene & xylene. However, due to additional processes like hydrodesulfurization, dechlorination, and hydrogenation as well as utilization of hydrogen makes the whole process expensive.

US2019/0233744A1 discloses the production of polypropylene using waste plastic pyrolysis oil. Wherein, pyrolysis oil undergoes hydrotreating processes such as hydrodesulfurization, hydrodenitrogenation, hydrodearomatization and separation to produce hydrocarbon streams that can be fed to steam cracker thereafter in polymerization reactor to produce polypropylenes. The treatment process further makes the process complex and expensive. U.S. Pat. No. 8,344,195B2 discloses a process in which pyrolysis oil from waste plastics is catalytically cracked using dolomite catalyst to produce naphtha and gas oils at different reaction temperature and pyrolysis times. Use of catalyst also increases the cost of whole process and also makes the process complex as compared to a non-catalytic process.

WO2001005908A1 discloses the process wherein heavy oil with waste plastics is catalytically cracked in pyrolysis reactor and resulting product is again catalytically cracked in second reactor to obtain gasoline and diesel using various catalysts. The continuous use of catalyst further leads to catalytic deactivation due to coke deposition and this creates process problems as the catalyst regeneration is required and/or induction of fresh catalyst is required.

US20150152334A1 relates to a delayed coking process comprising a mixed feed of residual heavy hydrocarbon feedstock and bio-oil obtained from fast pyrolysis of lignocellulosic biomass. The biomass comprises one or more of Jatropha, Cashew nut, Karanjia and Neem. The residual heavy hydrocarbon feedstock has boiling point in the range of 400° C. to 700° C.

It is noted that these known processes are complex, expensive and requires high energy to convert waste plastic into other useful products. The additional processes like hydrodesulfurization, dechlorination, and hydrogenation as well as utilization of hydrogen makes the whole process expensive. Further some of the known processes involve use of catalyst which further increases the cost of whole process and also makes the process complex as compared to a non-catalytic process. Moreover, continuous use of catalyst further leads to catalytic deactivation due to coke deposition and this creates process problems as the catalyst regeneration is required and/or induction of fresh catalyst is required.

Accordingly, there is a need for a process and apparatus which can convert the waste plastic into value added products and the whole process is economic as well as energy incentive. Moreover, there is a need of a process and apparatus which is simple to maintain and does not involve complex catalytic reactions which require continuous close monitoring and catalytic regeneration.

SUMMARY OF THE PRESENT INVENTION

The present invention discloses a process and apparatus for conversion of waste plastic pyrolysis oil into value added products.

Specifically, the present invention discloses a process and apparatus for producing pyrolysis oil from waste plastics in more energy efficient way and the produced oil in delayed coking unit (DCU) is utilized for obtaining more value-added products and coke. Further, the process and apparatus as disclosed herein includes integration of delayed coking unit (DCU) with pyrolysis section which allows utilization of heavy coker gas oil (HCGO) as preheating stream and also recovers value added light olefins such as ethylene, and propylene.

Accordingly, the process as disclosed herein includes melting a waste plastic feedstock (1) inside a preheating vessel (3), wherein, the said waste plastic feedstock (1) is melted by a heavy coker gas oil (HCGO) (30) as received from a delayed coker fractionator (19). A pyrolysis step inside a pyrolysis reactor (6) to pyrolyze a molten plastic stream (4) along with nitrogen (5), wherein, the pyrolysis reactor (6) generates a char component (7) from a bottom portion thereof, and a vapour component (8) from a top portion thereof. A condensation step to condense the said vapour component (8) using a heat exchanger (9) into a condensed stream (10), wherein, the said condensed stream

(10) is routed to the separator tower (11) to separate the gases (12) and the condensed liquid (13). Then separating the said condensed liquid (13) in two phase separator (14), wherein, the said condensed liquid (13) is separated into pyrolysis oil stream (15) and water (16). The pyrolysis oil stream (15) is further fractionated using fractionator (45) into two cuts, a heavier cut (47) and a lighter cut (46). The lighter cut of pyrolysis oil (46) is fed directly to the LCGO section of delayed coker fractionator (19). Mixing and separation step including mixing the heavier cut of pyrolysis oil stream (47) with a hot heavy residual feedstock (17) in a delayed coker fractionator (19) along with coke drum effluent (27, 28) to provide a resulting mixture (20) which is pumped through a coker furnace (21) to achieve a desired coking temperature of 470° C. to 500° C. Then thermal cracking of the said resulting mixture (20) inside the said coker furnace (21), wherein, the thermal cracking step results partial vaporization and mild cracking of the said resulting mixture (20) to give a two-phase mixture (22). After that delayed coking of the said two-phase mixture (22) inside a plurality of coke drums (25, 26), wherein, a heavier part of the pyrolysis oil stream (15) along with a heavy residue go through delayed coking resulting into the coke drum effluent (27, 28), a coke, and a wash liquid (24).

Accordingly, the apparatus as disclosed herein includes a preheating vessel (3) adapted to produce a molten plastic stream (4) by melting a waste plastic feedstock (1) with the help of a heavy coker gas oil (HCGO) (30) having temperature 290-390° C. The apparatus also includes a pyrolysis reactor (6) for pyrolyzing the said molten plastic stream (4) along with nitrogen (5) to produce a char component (7) and a vapour component (8), wherein, the said vapour component (8) is condensed into a condensed stream (10) through a heat exchanger (9). The apparatus also includes a separator tower (11) to separate an off gas (12) and a condensed liquid (13) from the said condensed stream (10), wherein, the said condensed liquid (13) is separated into pyrolysis oil stream (15) and water (16) through a two-phase separator (14). The said off gas (12) from the separator tower (11) is mixed with a coker off gas (36) and fed to light olefin recovery section (39) to get fuel gas (40), ethylene, propylene (41), LPG (42) and naphtha (43), wherein, the fuel gas (40) is used for burning in presence of air (44) to generate heat energy required for pyrolysis reactor (6) for maintaining reaction temperature.

The apparatus also includes a delayed coker fractionator (19) for mixing and separation of a mixed stream of hot heavy residual feedstock (17) the pyrolysis oil stream (15), coke drum effluent (27, 28), wherein, the said mixing provides a resulting mixture (20) which is pumped through a coker furnace (21) to achieve a desired coking temperature of 470° C. to 500° C., wherein, the resulting mixture (20) undergoes thermal cracking resulting in partial vaporization and mild cracking of the said resulting mixture (20) to give a two-phase mixture (22). Wherein, the said coke drum effluent (27, 28) is the outcome of the said plurality of coke drums (25, 26).

The delayed coker fractionator (19) produces the said Heavy coker gas oil (HCGO) (30), a Light coker gas oil (LCGO) (31), and a wet gas (37), wherein the wet gas (37) undergoes through a three-phase separator (35) resulting into gaseous hydrocarbons (36), water as aqueous phase (34) and unstabilized naphtha as liquid phase (32).

The apparatus also includes a plurality of coke drums (25, 26) to carry out thermal cracking (delayed coking) of the said two-phase mixture (22) resulting into coke drum effluent (27, 28), coke, and a wash liquid (24).

Accordingly, the process and apparatus as disclosed herein allows the DCU of a refinery to reuse the waste plastic in more efficient way by not only utilizing its pyrolysis oil as a quenching medium for stopping cracking reactions and reduces dependency on conventional quench oils, but also to produce distillates with higher liquid yields and less coke yields.

TECHNICAL ADVANTAGES OF THE INVENTION

The present invention provides technical advantages over the prior arts. The present invention facilitates the production of value-added products from waste plastic feedstock with lower coke yield.

Pyrolysis oil is not useable as the final product as gasoline or diesel owing to various impurity contents as well as higher pollutant emissions upon burning, while processing the pyrolysis oil in the process of present invention produces better quality fuels and other lighter products.

The process and apparatus as disclosed herein reduces overall energy requirements when compared to conventional process and apparatus.

Pyrolysis oil, being such a light oil in terms of Conradson Carbon Residue (CCR) is still compatible with heavy residual feed (low and high CCR) and produces liquid products with higher yields and reduces coke yields.

Pyrolysis oil can be used as quench oil because it has similar boiling range close to conventional wash oils such as LCGO or HCGO. Accordingly, the pyrolysis oil will be a good alternative for quenching coke drum vapours.

Integration of DCU with pyrolysis section not only provides HCGO as a preheating stream but also restricts the use of off gases of pyrolysis process to get consumed in preheating the plastic, which otherwise can be recovered in the form of valuable products such as ethylene, propylene etc.

OBJECTIVE OF THE PRESENT INVENTION

The objective of the present invention is to provide a process and an apparatus for converting waste plastic pyrolysis oil into valuable products.

The main objective of the present invention is to provide a process and an apparatus for producing pyrolysis oil from waste plastic in more energy efficient way and the produced oil in delayed coking unit (DCU) is utilized for obtaining more value-added products with lower coke yield.

The important objective of the present invention is to provide a process and an apparatus, wherein, the delayed coking unit (DCU) is integrated with pyrolysis section which allows utilization of heavy coker gas oil (HCGO) as preheating stream and recovers value added light olefins such as ethylene, and propylene.

Another objective of the present invention is to provide a process and an apparatus for converting waste plastic pyrolysis oil into valuable products without using catalysts.

BRIEF DESCRIPTION OF THE DRAWING

To further clarify advantages and aspects of the invention, a more particular description of the invention will be rendered by reference to specific embodiments thereof, which is illustrated in the appended drawing(s). It is appreciated that the drawing(s) of the present invention depicts only typical embodiments of the invention and are therefore not to be considered limiting of its scope.

DETAILED DESCRIPTION OF THE INVENTION

Figure 1:
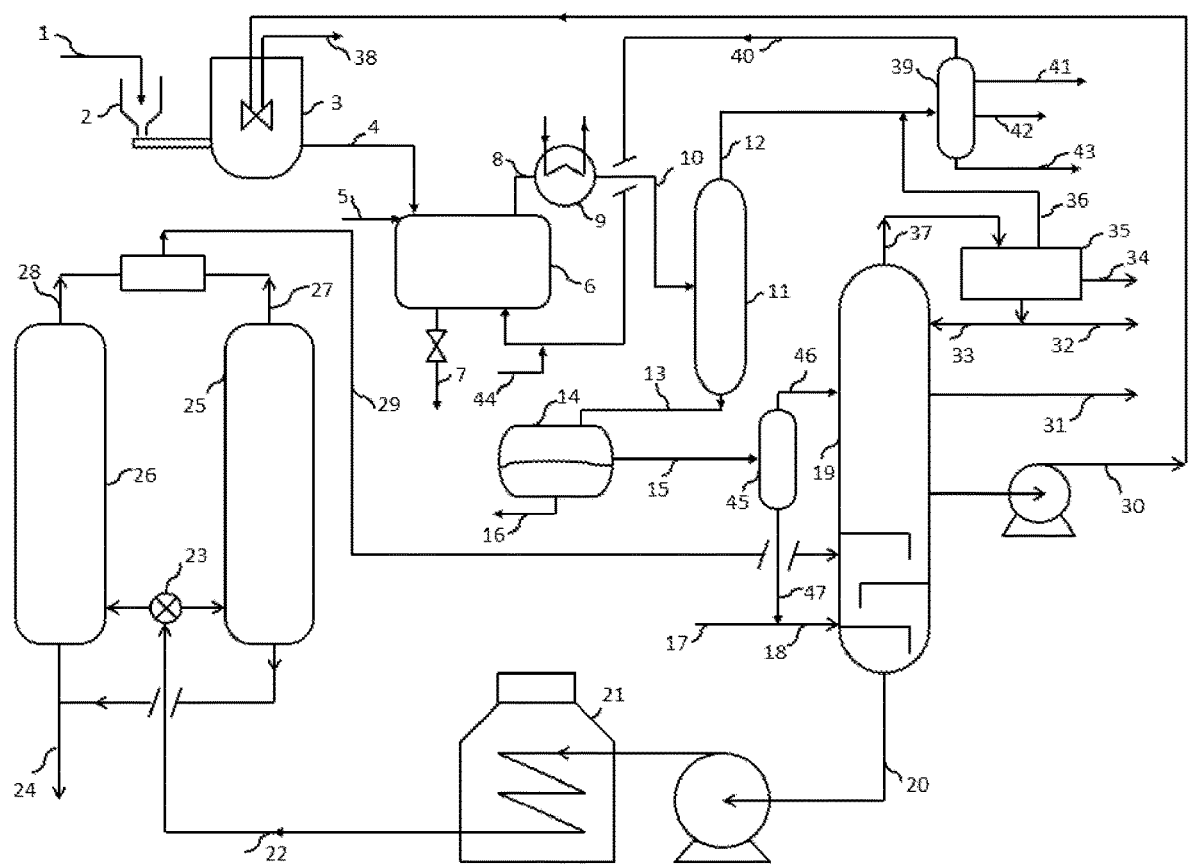
FIG. 1: illustrates a schematic diagram of the process requirements and apparatus components, wherein, heavier cut of pyrolysis oil stream (47) is mixed with hot heavy residual feedstocks and fed to the delayed coker fractionator.

For promoting an understanding of the principles of the present disclosure, reference will now be made to the specific embodiments of the present invention further illustrated in the drawings and specific language will be used to describe the same. The foregoing general description and the following detailed description are explanatory of the present disclosure and are not intended to be restrictive thereof. It will nevertheless be understood that no limitation of the scope of the present disclosure is thereby intended, such alterations and further modifications in the illustrated composition, and such further applications of the principles of the present disclosure as illustrated herein being contemplated as would normally occur to one skilled in the art to which the present disclosure relates. Unless otherwise defined, all technical and scientific terms used herein have the same meaning as commonly understood by one of ordinarily skilled in the art to which this present disclosure belongs. The methods, and examples provided herein are illustrative only and not intended to be limiting.

The process and apparatus as disclosed herein converts the waste plastic pyrolysis oil into valuable products by heat integration of DCU process with pyrolysis oil production, wherein, HCGO stream from delayed coker unit is used as a preheating stream. The process and apparatus further include co-processing of pyrolysis oil with residue feed such as vacuum residue in various configurations for producing more liquid & gaseous products with less coke yields. The process and apparatus also eliminate the use of off-gases of pyrolysis process to get consumed in providing required heat for maintaining reaction temperature, which otherwise can be recovered in the form of valuable products such as ethylene, and propylene.

Further, the process as disclosed herein generates valuable liquid products out of waste materials without really disturbing the hardware of the existing delayed coking (DC) technology and in fact improves the overall delayed coking process. The present process and apparatus as disclosed herein also overcomes high energy requirement for producing pyrolysis oil from waste plastics by utilizing HCGO as preheating stream which in turn reduces HCGO temperature to desired level such that it can be utilized in downstream processes such as HCGO hydrotreating. The present invention provides an alternative to the conventional quench oils which not only stops cracking reactions but also helps in increasing liquid yields.

The process as disclosed herein includes melting a waste plastic feedstock (1) inside a preheating vessel (3), wherein, the said waste plastic feedstock (1) is melted by a heavy coker gas oil (HCGO) (30) as received from a delayed coker fractionator (19). A pyrolysis step inside a pyrolysis reactor (6) to pyrolyze a molten plastic stream (4) along with nitrogen (5), wherein, the pyrolysis reactor (6) generates a char component (7) from a bottom portion thereof, and a vapour component (8) from a top portion thereof. A condensation step to condense the said vapour component (8) using a heat exchanger (9) into a condensed stream (10), wherein, the said condensed stream (10) is routed to the separator tower (11) to separate the gases (12) and the condensed liquid (13). Then separating the said condensed liquid (13) in two phase separator (14), wherein, the said condensed liquid (13) is separated into pyrolysis oil stream (15) and water (16). The pyrolysis oil stream (15) is further fractionated using fractionator (45) into two cuts, a heavier cut (47) and a lighter cut (46). The lighter cut of pyrolysis oil (46) is fed directly to the LCGO section of delayed coker fractionator (19).

The process further includes mixing and separation of a mixed stream of hot heavy residual feedstock (17), and the heavier cut of pyrolysis oil stream (47), coke drum effluent (27, 28), wherein, the said mixing is carried out inside a delayed coker fractionator (19) to provide a resulting mixture (20) which is pumped through a coker furnace (21) to achieve a desired coking temperature of 470° C. to 500° C. Then thermal cracking of the said resulting mixture (20) inside the said coker furnace (21), wherein, the thermal cracking step results partial vaporization and mild cracking of the said resulting mixture (20) to give a two-phase mixture (22). After that thermal cracking of the said two-phase mixture (22) inside a plurality of coke drums (25, 26), wherein, a heavier part of the pyrolysis oil stream (15) along with a heavy residue go through the thermal cracking (delayed coking) resulting into the coke drum effluent (27, 28), coke, and a wash liquid (24).

The apparatus as disclosed herein includes a preheating vessel (3) adapted to produce a molten plastic stream (4) by melting a waste plastic feedstock (1) with the help of a heavy coker gas oil (HCGO) (30) having temperature 290-390° C. The apparatus also includes a pyrolysis reactor (6) for pyrolyzing the said molten plastic stream (4) along with nitrogen (5) to produce a char component (7) and a vapour component (8), wherein, the said vapour component (8) is condensed into a condensed stream (10) through a heat exchanger (9). The apparatus also includes a separator tower (11) to separate an off gas (12) and a condensed liquid (13) from the said condensed stream (10), wherein, the said condensed liquid (13) is separated into pyrolysis oil stream (15) and water (16) through a two-phase separator (14). The said off gas (12) from the separator tower (11) is mixed with a coker off gas (36) and fed to light olefin recovery section (39) to get fuel gas (40), ethylene, propylene (41), LPG (42) and naphtha (43), wherein, the fuel gas (40) is used for burning in presence of air (44) to generate heat energy required for pyrolysis reactor (6) for maintaining reaction temperature.

The apparatus also includes a delayed coker fractionator (19) for mixing and separation of a mixed stream of hot heavy residual feedstock (17), and the heavier cut of pyrolysis oil stream (47), a coke drum effluent (27, 28), wherein, the said mixing provides a resulting mixture (20) which is pumped through a coker furnace (21) to achieve a desired coking temperature of 470° C. to 500° C., wherein, the resulting mixture (20) undergoes thermal cracking resulting in partial vaporization and mild cracking of the said resulting mixture (20) to give a two-phase mixture (22). The lighter cut of pyrolysis oil (46) is fed directly to the LCGO section of delayed coker fractionator (19). Wherein, the said coke drum effluent (27, 28) is the outcome of the said plurality of coke drums (25, 26).

The delayed coker fractionator (19) produces the said heavy coker gas oil (HCGO) (30), a Light coker gas oil (LCGO) (31), and a wet gas (37), wherein the wet gas (37) undergoes through a three-phase separator (35) resulting into gaseous hydrocarbons (36), water as aqueous phase (34) and unstabilized naphtha as liquid phase (32).

The apparatus also includes a plurality of coke drums (25, 26) to carry out thermal cracking of the said two-phase mixture (22) resulting into coke drum effluent (27, 28), coke, and a wash liquid (24).

Plastic Feedstock

Pyrolysis oil is produced from thermal degradation of different types of waste plastics which includes High density Polyethene (HDPE), Low density Polyethene (LDPE), Polypropylene (PP), Polystyrene (PS) and mixed plastics i.e. mixture of Polyethylene (PE), Polypropylene (PP), and Polystyrene (PS) or mixture of LDPE, HDPE & PP. PET and PVC are not recommended for pyrolysis because both of them produces lower liquid yield compared to gas yields. Moreover, the pyrolysis of PET and PVC resulted in the formation of corrosive benzoic acid and toxic HCl respectively, which can pose major challenge to life of reactor, safety and environment. HDPE finds application in milk bottles, detergent bottles, toys manufacturing and produces a high liquid yield on pyrolysis. LDPE finds application in plastic bags, foils, trash bags and is the second largest amount plastics found in MSW. It produces high liquid yield with low gas and negligible char yield on pyrolysis. PP has diverse applications in office folders, car bumpers, carpets, furniture and storage boxes. It is the largest amount of plastic found in Municipal Solid Wastes (MSW) and it produces decent liquid yields along with coke. PS is widely used in electronics, constructions, medical appliances and toys and on pyrolysis a very high liquid yield with low gas yield is obtained. Mixed plastics produce both liquid yields close to 48 wt % on pyrolysis. Pyrolysis oil obtained from mixed plastics has been used for this study.

Pyrolysis Oil Properties

The properties of pyrolysis oil include density in the range of 0.7-0.95 g/cc, CCR ranges from 0.05 to 2 wt. %, and sulfur in the range of 10-700 wppm. Heavy residual feedstocks such as vacuum residue, Reduced Crude Oil, VB Tar etc. with CCR in the range of 3 to 30 wt. % is employed along with pyrolysis oil.

Process Conditions

Delayed Coker reactor & fractionator/section: The operating temperature for delayed coking process varies from 460-520° C. with pressure from 1-5 Kg/cm$^2$ and cycle time in the range of 10 to 32 hrs. Temperature of HCGO stream coming out of fractionator is 290-390° C.

Pyrolysis reactor/section: The process conditions for production of pyrolysis oil from waste plastic includes temperature which ranges from 250-550° C. at atmospheric pressure with holding time of 1-6 hrs. Operating Temperature range of preheating vessel is 30-290° C. at atmospheric pressure.

Process Description

The process of the present invention is exemplified by the figures as provided in the present disclosure, but not limited to the figures.

FIG. 1 shows the process flow diagram for the embodiment-1 of the present claimed process. Waste plastics feedstock (1) is fed into the hopper (2) and conveyed into the preheating vessel (3), wherein, HCGO (30) from the delayed coker fractionator (19) serves as a preheating stream which causes melting of waste plastics leaving relatively cooler HCGO stream (38).

The molten plastic stream (4) along with Nitrogen ($N_2$) (5) is fed into the pyrolysis reactor (6) leaving char (7) from bottoms while the vapours (8) from top leaves the reactor and is condensed using heat exchanger (9) and condensed stream (10) is routed to the separator tower (11). Wherein, gases (12) leave from the top of the separator tower (11) and condensed liquid (13) leaves from bottom of the separator tower (11) while pyrolysis oil stream (15) and water (16) both are separated in two phase separator (14). The pyrolysis oil stream (15) is further fractionated using fractionator (45) into two cuts, heavier cut (47) & lighter cut (46).

The heavier cut of pyrolysis oil stream (47) is mixed with hot heavy residual feedstocks (17) and mixed stream (18) is fed to the delayed coker fractionator (19), wherein, the mixed stream (18) further mixes with condensed recycle. The lighter cut of pyrolysis oil (46) is fed directly to the LCGO section of delayed coker fractionator (19). The resulting mixture (20) is pumped through a coker furnace (21) using fractionator bottom pump(s), for achieving the desired coking temperature (usually between 470° C. and 500° C.) which also results in the partial vaporization and mild cracking of mixture (20).

A two-phase mixture (22) usually vapor-liquid comes out of the coker furnace (21) and control valve (23) diverts it to a coke drum(s) (25, 26). The said coke drum(s) (25, 26) provides sufficient residence time for the thermal cracking to take place till the completion of coking reaction. The vapours of coke drum effluent (27, 28) produced during thermal cracking, exits the coke drum(s) (25, 26). The temperature of coke drum effluent (27, 28) determines the average outlet temperature of the coke drum(s) (25, 26). The gas oils from the coke drum effluent (27, 28) are used as quenching stream which terminates further thermal cracking to avoid coke formation in vapor transfer line (29). Here, thermal cracking of heavier part of pyrolysis oil along with heavy residue will occur as some lighter part will be fractionated out in fractionator (19). It enhances liquid yields and reduces coke yield.

In the present disclosure, a plurality of coke drums is used, specifically, two number of coke drums (25, 26) are operated in parallel to ensure smooth functioning of coking cycle. When coke drum (25) is full of coke, the coking cycle ends and the coker furnace (21) outlet flow is then transferred from coke drum (25) to a parallel coke drum (26) to initiate its coking cycle, while coke removal process is initiated in the filled drum (25) which comprises of steaming, water cooling, coke cutting, and vapor heating and draining. The wash liquid (24) from the coke drums (25, 26) is discharged into the blow down section. The coke drum effluent (27, 28) after quenching are again sent to the bottom of the delayed coker fractionator (19) using vapor transfer line (29), where it is separated and recovered.

Further, Heavy coker gas oil (HCGO) (30) and Light coker gas oil (LCGO) (31) are drawn off the delayed coker fractionator (19) at desired boiling temperature ranges using side strippers. The wet gas (37) coming out of the top of the delayed coker fractionator (19) goes to three phase separator (35), wherein, gaseous hydrocarbons (36), water as aqueous phase (34) and unstabilized naphtha as liquid phase (32) are separated and reflux stream (33) is sent back to the delayed coker fractionator (19).

Further, the off gas (12) coming from pyrolysis process of the separator tower (11) is mixed with coker off gases (36) and fed to a light olefin recovery section (39) to get fuel gas (40) from the top which is fed back to pyrolysis reactor (6) in presence of air (44) for maintaining reaction temperature. Further, the said light olefin recovery section (39) also generates ethylene, propylene (41), LPG (42) and naphtha (43) from the bottom thereof.

Figure 2:
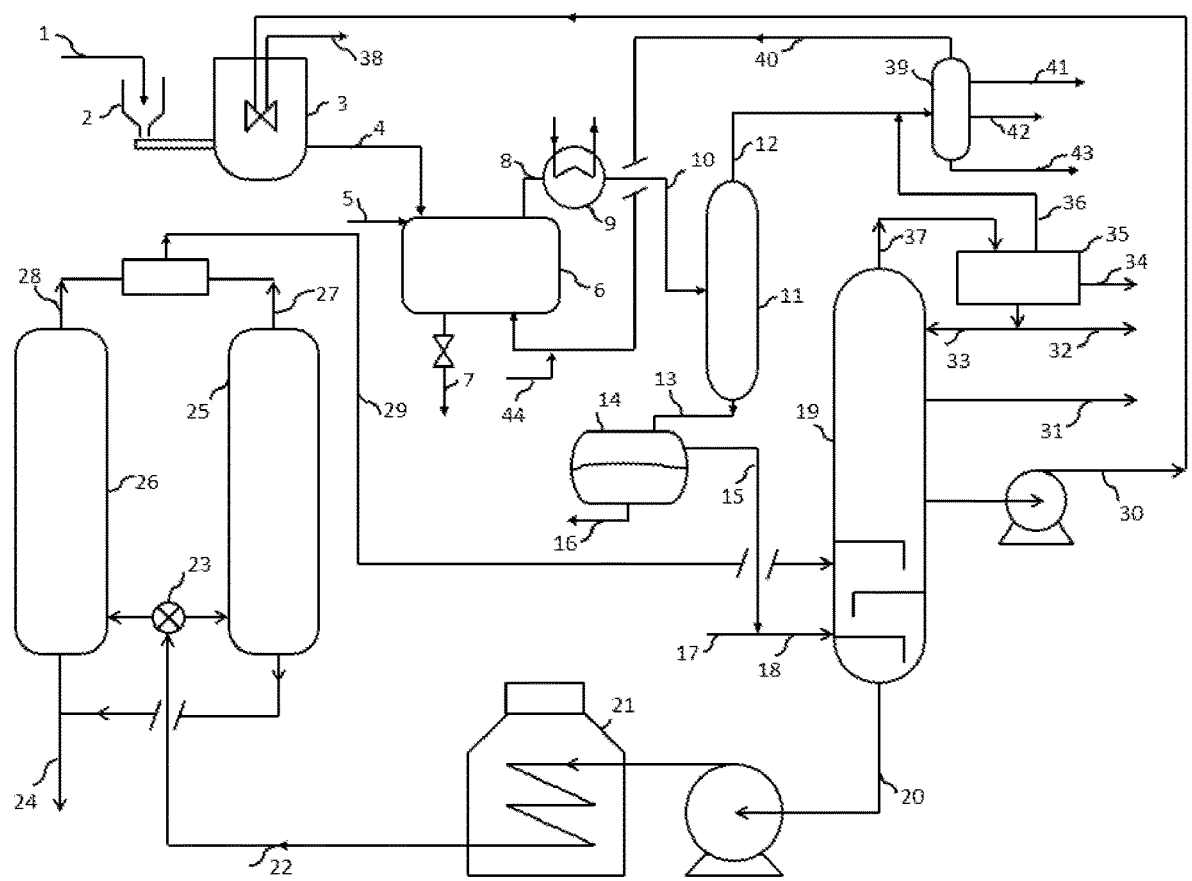
FIG. 2: illustrates a schematic diagram of the process requirements and apparatus components, wherein, pyrolysis oil stream (15) is mixed with hot heavy residual feedstocks and fed to the delayed coker fractionator.

FIG. 2 shows the process flow diagram for the embodiment-2 of the present claimed process. Waste plastics feedstock (1) is fed into the hopper (2) and conveyed into the preheating vessel (3), wherein, HCGO (30) from the delayed coker fractionator (19) serves as a preheating stream which causes melting of waste plastics leaving relatively cooler HCGO stream (38).

The molten plastic stream (4) along with Nitrogen (N$_2$) (5) is fed into the pyrolysis reactor (6) leaving char (7) from bottoms while the vapours (8) from top leaves the reactor and is condensed using heat exchanger (9) and condensed stream (10) is routed to the separator tower (11). Wherein, gases (12) leave from the top of the separator tower (11) and condensed liquid (13) leaves from bottom of the separator tower (11) while pyrolysis oil stream (15) and water (16) both are separated in two phase separator (14).

The pyrolysis oil stream (15) is mixed with hot heavy residual feedstocks (17) and mixed stream (18) is fed to the delayed coker fractionator (19), wherein, the mixed stream (18) further mixes with condensed recycle to produce a resulting mixture (20). The resulting mixture (20) is pumped through a coker furnace (21) using fractionator bottom pump(s), for achieving the desired coking temperature (usually between 470° C. and 500° C.) which also results in the partial vaporization and mild cracking of mixture (20).

A two-phase mixture (22) usually vapor-liquid comes out of the coker furnace (21), and a control valve (23) diverts it to a plurality of coke drums (25, 26). The said plurality of coke drums (25, 26) provides sufficient residence time for the thermal cracking to take place till the completion of coking reaction. The vapours of coke drum effluent (27, 28) produced during thermal cracking, exits the coke drum(s) (25, 26). The temperature of coke drum effluent (27, 28) determines the average outlet temperature of the coke drum (s) (25, 26). The gas oils from the coke drum effluent (27, 28) are used as quenching stream which terminates further thermal cracking to avoid coke formation in vapor transfer line (29). Here, thermal cracking of heavier part of pyrolysis oil along with heavy residue will occur as some lighter part will be fractionated out in fractionator (19). It enhances liquid yields and reduces coke yield.

In the present disclosure, a plurality of coke drums is used, specifically, two number of coke drums (25, 26) are operated in parallel to ensure smooth functioning of coking cycle. When coke drum (25) is full of coke, the coking cycle ends and the coker furnace (21) outlet flow is then transferred from coke drum (25) to a parallel coke drum (26) to initiate its coking cycle, while coke removal process is initiated in the filled drum (25) which comprises of steaming, water cooling, coke cutting, and vapor heating and draining. The wash liquid (24) from the coke drums (25, 26) is discharged into the blow down section. The coke drum effluent (27, 28) after quenching are again sent to the bottom of the delayed coker fractionator (19) using vapor transfer line (29), where it is separated and recovered.

Further, Heavy coker gas oil (HCGO) (30) and Light coker gas oil (LCGO) (31) are drawn off the delayed coker fractionator (19) at desired boiling temperature ranges using side strippers. The wet gas (37) coming out of the top of the delayed coker fractionator (19) goes to three phase separator (35), wherein, gaseous hydrocarbons (36), water as aqueous phase (34) and unstabilized naphtha as liquid phase (32) are separated and reflux stream (33) is sent back to the delayed coker fractionator (19).

Further, the off gas (12) coming from pyrolysis process of the separator tower (11) is mixed with coker off gases (36) and fed to a light olefin recovery section (39) to get fuel gas (40) from the top which is fed back to pyrolysis reactor (6) in presence of air (44) for maintaining reaction temperature. Further, the said light olefin recovery section (39) also generates ethylene, propylene (41), LPG (42) and naphtha (43) from the bottom thereof.

Figure 3:
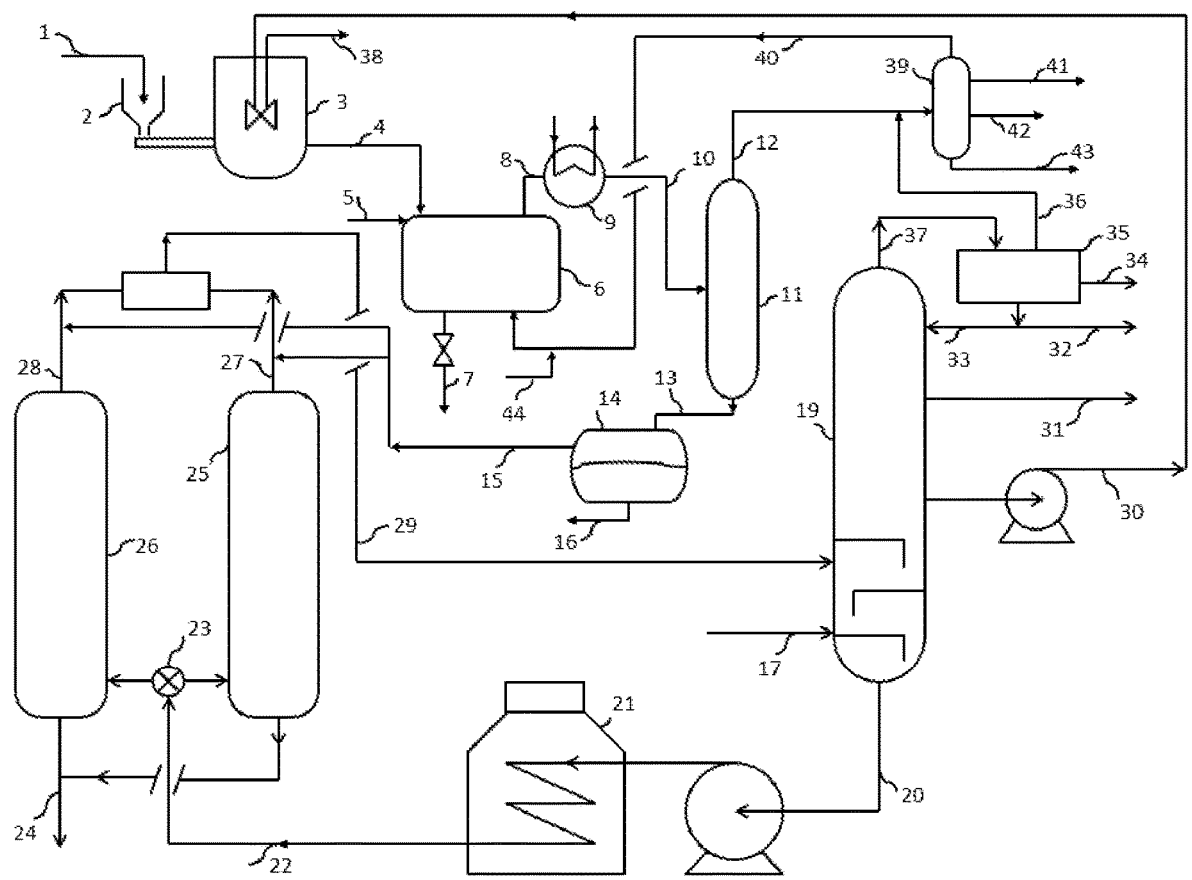
FIG. 3: illustrates a schematic diagram of the process requirements and apparatus components, wherein, coke drum effluent (27, 28) stream is quenched with pyrolysis oil and fed to the delayed coker fractionator.

Further, FIG. 3 shows the process flow diagram for the embodiment-3 of the invented process. The waste plastics feedstock (1) is fed into the hopper (2) and conveyed into the preheating vessel (3), wherein, HCGO (30) from a delayed coker fractionator (19) serves as a preheating stream which causes melting of waste plastics leaving relatively cooler HCGO stream (38).

The molten plastic stream (4) along with Nitrogen (N$_2$) (5) is fed into the pyrolysis reactor (6) leaving char (7) from bottoms while the vapours (8) from top leaves the reactor and is condensed using heat exchanger (9) and condensed stream (10) is routed to the separator tower (11). Wherein, gases (12) leaves from the top of the separator tower (11) and condensed liquid (13) from bottom of the separator tower (11) while pyrolysis oil stream (15) and water (16) both are separated in two phase separator (14).

The pyrolysis oil stream (15) is mixed with hot heavy residual feedstock (17) is fed to delayed coker fractionator (19) where it mixes with condensed recycle. The resulting mixture (20) is pumped through a coker furnace (21) using fractionator bottom pump(s), for achieving the desired coking temperature (usually between 470° C. and 500° C.) which also results in the partial vaporization and mild cracking of mixture (20).

A two-phase mixture (22) usually vapor-liquid comes out of the coker furnace (21) and control valve (23) diverts it to a coke drum(s) (25, 26). The said coking drum(s) (25, 26) provides sufficient residence time for the thermal cracking to take place till the completion of coking reaction. The vapours of coke drum effluent (27, 28) produced during thermal cracking, exits the coke drum(s) stream (25, 26). The temperature of coke drum effluent (27, 28) determines the average outlet temperature of the coke drum(s) (25, 26).

Specifically, the obtained pyrolysis oil stream (15) is then mixed with coke drum effluent (27, 28) acting as a quench oil which not only terminates further thermal cracking to avoid coke formation in vapor transfer line (29) but also condenses the heavy part of coke drum vapours. The lighter part of pyrolysis oil will not be cracked as it is fractionated out as naphtha and gases which in turn increases overall the liquid yield. Further, a plurality of coke drums (25, 26) are used, specifically, two number of coke drums (25, 26) are operated in parallel in order to ensure smooth functioning of coking cycle. When coke drum (25) is full of coke, the coking cycle ends and the coker furnace (21) outlet flow is then transferred from coke drum (25) to a parallel coke drum (26) to initiate its coking cycle, while coke removal process is initiated in the filled drum (25) which comprises of steaming, water cooling, coke cutting, and vapor heating and draining. The wash liquid (24) from the coke drums (25, 26) is discharged into the blow down section. The coke drum effluent (27, 28) after quenching is again sent to fractionator bottom of the delayed coker fractionator (19) using vapor transfer line (29), where it is separated and recovered.

Further, Heavy coker gas oil (HCGO) (30) and Light coker gas oil (LCGO) (31) are drawn off the fractionator at desired boiling temperature ranges using side strippers. The wet gas (37) coming out of fractionator top goes to three phase separator (35), gaseous hydrocarbons (36), water as aqueous phase (34) and unstabilized naphtha as liquid phase (32) are separated with reflux stream (33) going back to the delayed coker fractionator (18). The off gas (12) coming from pyrolysis process separator is mixed with coker off gases (36) and fed to light olefin recovery section (39) to get fuel gas (40) from the top which is fed back to pyrolysis reactor (6) in presence of air (44) for maintaining reaction temperature, ethylene, propylene (41), LPG (42) and naphtha (43) from the bottom.

Figure 4:
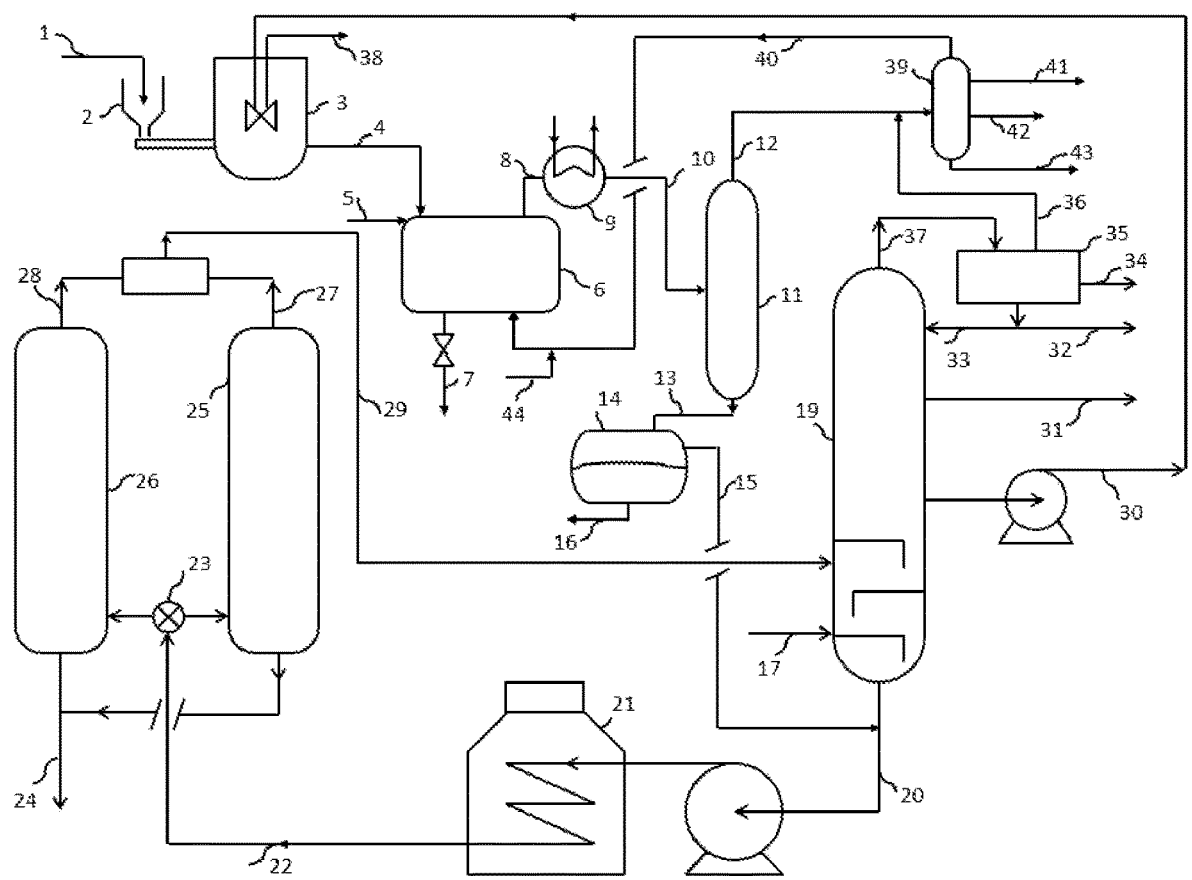
FIG. 4: illustrates a schematic diagram of the process requirements and apparatus components, wherein obtained pyrolysis oil stream (15) is directly mixed with delayed coker fractionator bottom outlet stream.

Further, FIG. 4 shows the process flow diagram for the embodiment-4 of the invented process. The waste plastics feedstock (1) is fed into the hopper (2) and conveyed into the preheating vessel (3) where HCGO (30) from delayed coker fractionator (19) serves as a preheating stream which causes melting of waste plastics leaving relatively cooler HCGO stream (38).

The molten plastic stream (4) along with Nitrogen (N₂) (5) is fed into the pyrolysis reactor (6) leaving char (7) from bottoms while the vapors (8) from top leaves the reactor and is condensed using heat exchanger (9) and condensed stream (10) is routed to the separator tower (11). Wherein, gases (12) leaves from the top of the separator tower (11) and condensed liquid (13) from bottom of the separator tower (11) while pyrolysis oil stream (15) and water (16) both are separated in two phase separator (14).

Specifically, the obtained pyrolysis oil stream (15) is mixed directly with fractionator bottom outlet stream (20) which contains hot heavy residual feedstocks (18) and condensed recycle. The resulting mixture (20) is pumped through a coker furnace (21) using fractionator bottom pump(s), for achieving the desired coking temperature (usually between 470° C. and 500° C.) which also results in the partial vaporization and mild cracking of mixture (20). A two-phase mixture (22) usually vapor-liquid comes out of the coker furnace (21) and control valve (23) diverts it to coke drum(s) (25, 26). The coke drum(s) (25, 26) provide sufficient residence time for the thermal cracking to take place till the completion of coking reaction. The vapours of coke drum effluent (27, 28) produced during thermal cracking, exits the coke drum(s) (25, 26). The temperature of coke drum effluent (27, 28) determines the average outlet temperature of the drum. Here, thermal cracking of lighter as well as heavier part of pyrolysis oil occurs along with residue which in turn increases overall the liquid yield. A plurality of coke drum(s) (25, 26) are used, specifically, two number of coke drum(s) (25, 26) are operated in parallel to ensure smooth functioning of coking cycle. When coke drum (25) is full of coke, the coking cycle ends and the furnace outlet flow is then transferred from coke drum (25) to a parallel coke drum (26) to initiate its coking cycle, while coke removal process is initiated in the filled drum (25) which comprises of steaming, water cooling, coke cutting, and vapor heating and draining. The wash liquid (24) from the drums is discharged into the blow down section. The coke drum effluent (27, 28) after quenching is again sent to the bottom (19) of the delayed coker fractionator (18) using vapor transfer line (29), where it is separated and recovered. Heavy coker gas oil (HCGO) (30) and Light coker gas oil (LCGO) (31) are drawn off the fractionator at desired boiling temperature ranges using side strippers. The wet gas (37) coming out of the top of delayed coker fractionator (18) goes to three phase separator (35), gaseous hydrocarbons (36), water as aqueous phase (34) and unstabilized naphtha as liquid phase (32) are separated with reflux (33) to the fractionator (19). The off gas (12) coming from pyrolysis process separator is mixed with coker off gases (36) and fed to light olefin recovery section (39) to get Fuel gas (40) from the top which is fed back to pyrolysis reactor (6) in presence of air (44) for maintaining reaction temperature, ethylene, propylene (41), LPG (42) and naphtha (43) from the bottom.

EXAMPLE 1

Integration of delayed coking unit (DCU) with waste plastic pyrolysis oil production is explained herein. The pyrolysis oil generated from waste plastics require temperature up to 450° C. which means large amount of energy requirement. The integration of DCU involves initial preheating of waste plastics up to its melting temperature using one of the product streams of DCU fractionator i.e., HCGO which leaves the fractionator at around 360° C. Here, the HCGO coming out-off the fractionator is utilized as a stream which will preheat the waste plastics to its melting temperature as shown in FIG. 1-3, thus the amount of energy supplied by the heater will be reduced as compared to earlier know processes. A simulation has been carried out in this regard taking HCGO with inlet temperature as 360° C. and plastic with inlet temperature as 30° C. Accordingly, the heat as required to raise the temperature of waste plastic feedstock becomes half as compared to without preheating. Here, heat required without preheat implies heat required to raise temperature of plastic from 30° C. to reaction temperature i.e. 450° C. Now as depicted in table 1, the heater needs to supply only 2632 KJ/h i.e. 42% of initial heat. This way, HCGO can be utilized as a heat integrating fluid.

TABLE 1

Indicating heat supplied with preheat and heat required w/o preheat

| | Inlet Temp (° C.) | Mass in (Kg/hr) | Outlet Temp (° C.) | Heat supplied with preheat (KJ/h) | Heat required w/o preheat (KJ/h) |
|---|---|---|---|---|---|
| Plastic | 30 | 5 | 260 | 3573 | 6205 |
| HCGO | 360 | 15 | 249 | | |

EXAMPLE 2

Experiments in Micro-Coker Unit was carried out using the waste plastic pyrolysis oil with properties provided in Table-2, by dosing it into two categories of DCU feed samples namely, Low CCR (15 wt. %) & High CCR (24 wt. %). This was carried out to cover both DCUs operating with low and high CCR feedstocks. For each feed case, one base case without pyrolysis oil and two runs with 5 & 10 wt. % dosing was carried out. Experiments were conducted at a reaction temperature of 486° C. & 1 Kg/cm²g pressure.

TABLE 2

Properties of Waste plastic pyrolysis oil

| Property | Unit | Value |
|---|---|---|
| Density @ 15° C. | g/cc | 0.8732 |
| CCR | wt % | 0.18 |
| KV@40° C. | cSt | 1.255 |
| Sulfur | ppm | 525 |
| Nitrogen | % | 0.8 |
| Asphaltene | ppm | <100 |
| ASTM D2887 distillation, wt % vs ° C. | | |
| 5/10/30/50/70/90/95/100 | | 107/129/138/147/228/332/384/450 |

Figure 5:
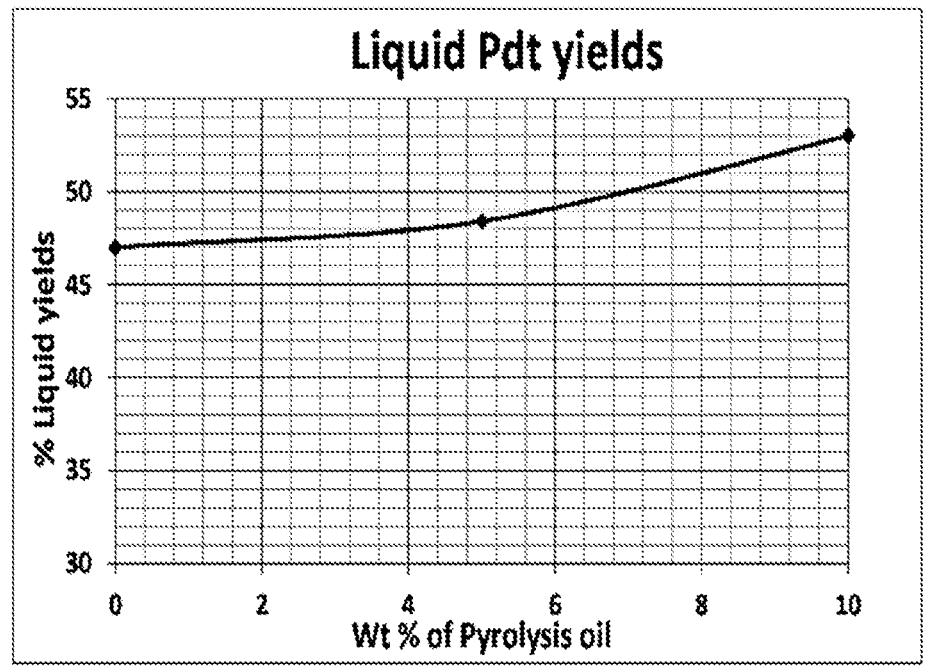
FIG. 5: illustrates a graph depicting liquid yields for different content of pyrolysis oil in low CCR feed.

Micro-Coker experimental results for low CCR feed case are provided in Table 3 and are graphically represented in FIGS. 4 & 5. From the table 3, it can be seen that as we increase the pyrolysis oil content in residue feed, the liquid yield increases and coke yield decreases. From these figures, it can be concluded that the liquid yield increases, and coke yield decreases with addition of waste plastic pyrolysis oil in comparison with the base case by 6 wt. % and 2.6 wt. % respectively.

TABLE 3

Product yields of Micro-Coker runs (low CCR feed)

| Run # | 1 | 2 | 3 |
|---|---|---|---|
| Pyrolysis Oil added, wt. % | 0 | 5 | 10 |
| Gas, wt. % | 23.5 | 23.4 | 20.1 |
| Light Naphtha, wt. % | 3.27 | 1.44 | 2.59 |
| Heavy naphtha, wt. % | 4.38 | 6.46 | 7.31 |
| Light Coker Gas Oil, wt. % | 24.73 | 23.48 | 25.18 |
| Heavy Coker Gas Oil, wt. % | 12.68 | 14.41 | 15.52 |
| Coker Fuel Oil, wt. % | 1.94 | 2.61 | 2.40 |
| Coke, wt. % | 29.5 | 28.2 | 26.9 |
| Total | 100 | 100 | 100 |

Figure 6:
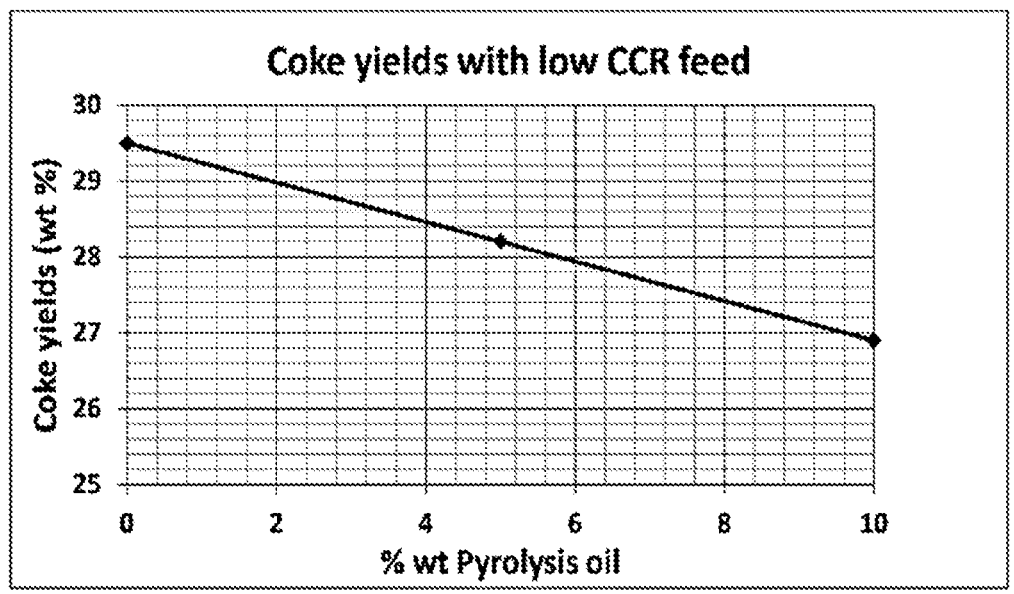
FIG. 6: illustrates a graph depicting coke yields for different content of pyrolysis oil in low CCR feed.
Figure 7:
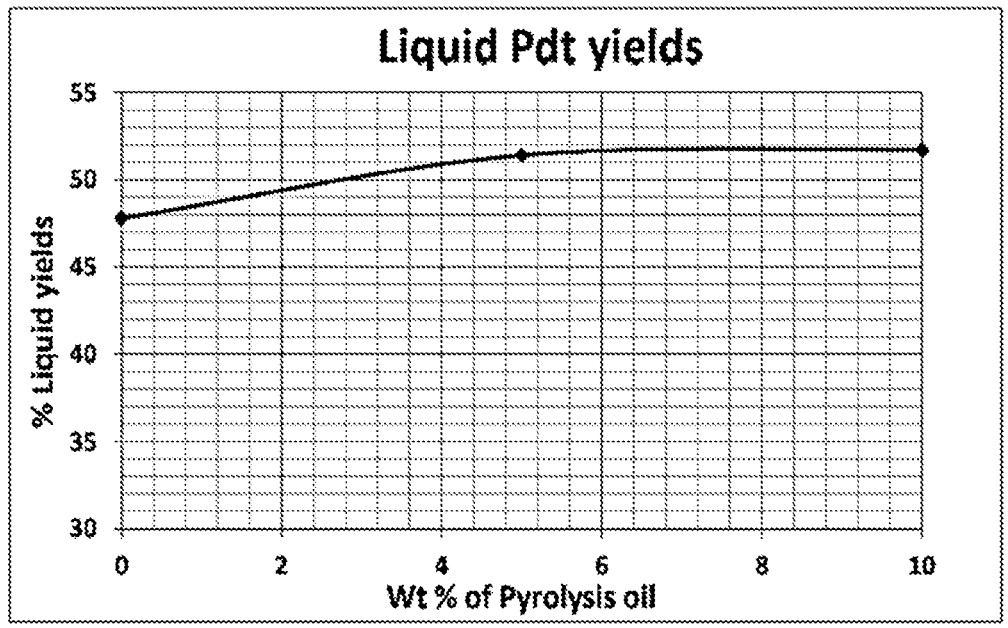
FIG. 7: illustrates a graph depicting liquid yields for different content of pyrolysis oil in high CCR feed.
Figure 8:
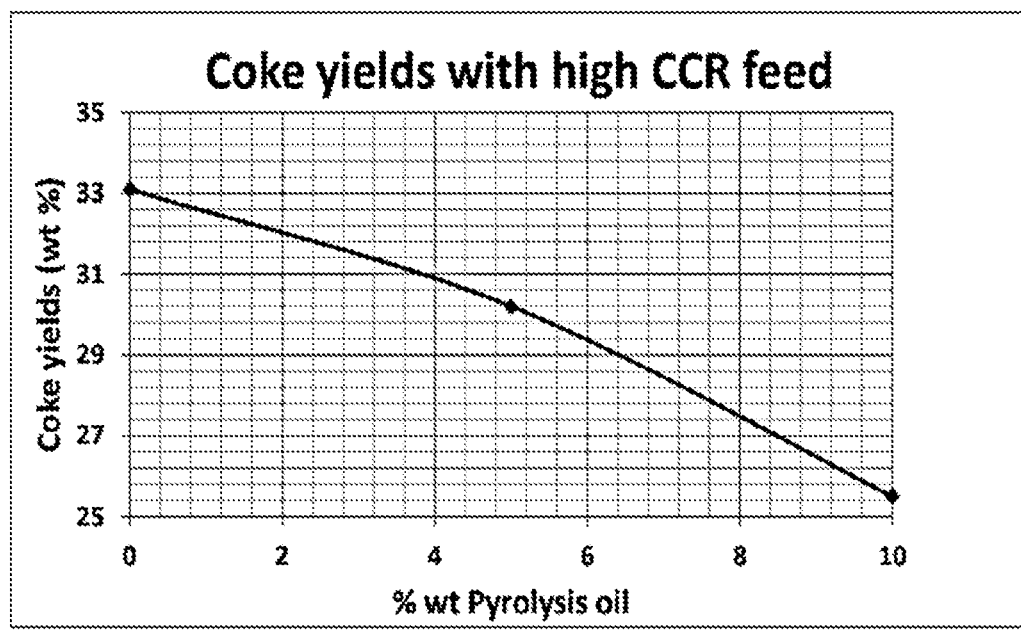
FIG. 8: illustrates a graph depicting coke yields for different content of pyrolysis oil in high CCR feed.

Further, Micro-Coker experimental results for high CCR feed case are provided in Table 4 and are graphically represented in FIGS. 6 & 7. From the table 4, it can be seen that as we increase the pyrolysis oil content in residue feed, the liquid yield increases and coke yield decreases. From these figures, it can be concluded that liquid yield increases, and coke yield decreases with addition of waste plastic pyrolysis oil in comparison with the base case by 3.92 wt. % and 5.2 wt. % respectively.

TABLE 4

Product yields of Micro-Coker runs (High CCR feed)

| Run # | 5 | 6 | 7 |
|---|---|---|---|
| Pyrolysis Oil added, wt. % | 0 | 5 | 10 |
| Gas, wt. % | 19.1 | 18.4 | 20.4 |
| Light Naphtha, wt. % | 3.65 | 6.23 | 5.23 |
| Heavy naphtha, wt. % | 1.88 | 3.46 | 4.34 |
| Light Coker Gas Oil, wt. % | 35.45 | 37.26 | 36.95 |
| Heavy Coker Gas Oil, wt. % | 6.82 | 4.45 | 5.18 |
| Coke, wt. % | 33.1 | 30.2 | 27.9 |
| Total | 100 | 100 | 100 |

Further, a pure pyrolysis micro coker run is also carried out and results are provided in Table 5. It can be concluded that liquid yield is close to 88 wt. % while coke yield is very less as the pyrolysis oil has negligible CCR (0.15-0.3 wt. %).

TABLE 5

Product yields of micro coker run with 100% Pyrolysis Oil

| Run | 100% Pyrolysis Oil |
|---|---|
| Gas, wt. % | 9.3 |
| Light Naphtha, wt. % | 1.31 |
| Heavy naphtha, wt. % | 28.65 |
| LCGO, wt. % | 49.02 |
| HCGO, wt. % | 7.16 |
| CFO, wt. % | 1.86 |
| Coke, wt. % | 2.7 |

Accordingly, the process and apparatus as disclosed herein generates valuable liquid products out of waste materials without really disturbing the hardware of the existing delayed coking (DC) technology and in fact improves the overall delayed coking process. Further, the process and apparatus as disclosed herein overcomes high energy requirement for producing pyrolysis oil from waste plastics by utilizing HCGO as preheating stream which in turn reduces HCGO temperature to desired level such that it can be utilized in downstream processes such as HCGO hydrotreating.

The present disclosure provides an alternative to the conventional quench oils which not only stops cracking reactions but also helps in increasing liquid yields. The present disclosure solves the problem of burning of off gases of pyrolysis section to get consumed in providing required heat for maintaining reaction temperature which otherwise can be recovered in the form of valuable products such as ethylene, propylene etc.

Moreover, the process as disclosed herein describes about various processes, wherein, pyrolysis oil from waste plastics can be utilized in delayed coker unit to produce more value distillates with high liquid yields and less coke yields from low value residual hydrocarbons using thermal cracking. Wherein, the thermal cracking is carried out without the requirement of treatment processes such as hydrodesulfurization, dechlorination, hydrogenation etc. and the process is free from hydrogen consumption. Further, the present process does not require any kind the treatment processes for production of high value distillate from thermal cracking of residual hydrocarbon. Moreover, process as disclosed herein does not require catalyst as in case of polymerization which is an added advantage because catalyst effective utilization is a challenge, and it makes process more costly compared to non-catalyst processes. Specifically, the process as disclosed herein involves thermal cracking of pyrolysis oil to produce cracked oil product with liquid yield higher than catalytically cracked oil by 30%.

We claim:

1. A process for conversion of waste plastic pyrolysis oil into value added products, wherein the process comprises:
    melting a waste plastic feedstock inside a preheating vessel, wherein the waste plastic feedstock is melted by a heavy coker gas oil (HCGO) to form a molten plastic stream;
    pyrolyzing the molten plastic stream in a pyrolysis reactor in presence of nitrogen, wherein the pyrolysis reactor generates a char component from a bottom portion thereof, and a vapour component from a top portion thereof;

condensing the vapour component using a heat exchanger into a condensed stream, wherein the condensed stream is routed to a separator tower to separate gases and condensed liquid;

separating the condensed liquid in a two phase separator, wherein the condensed liquid is separated into a pyrolysis oil stream and water;

fractionating the pyrolysis oil stream through a fractionator into a heavier cut, and a lighter cut, wherein the lighter cut is fed directly to a light coker gas oil (LCGO) section of a delayed coker fractionator;

mixing a hot heavy residual feedstock, and the heavier cut of the pyrolysis oil stream to obtain a mixed stream, wherein the mixed stream is fed to the delayed coker fractionator wherein the mixed stream is further mixed with a condensed recycle to provide a resulting mixture, and pumping the resulting mixture through a coker furnace to achieve a desired coking temperature of 470° C. to 500° C.;

thermally cracking the resulting mixture inside the coker furnace, wherein the thermal cracking results in partial vaporization and mild cracking of the resulting mixture to give a two-phase mixture; and thermally cracking the two-phase mixture inside a plurality of coke drums, wherein the heavier cut of the pyrolysis oil stream along with a heavy residue go through the thermal cracking resulting an effluent from the coke drum, coke, and a wash liquid.

2. The process as claimed in claim 1, wherein the preheating vessel is operated at an operating temperature in a range of 30° C.-290° C. and at atmospheric pressure.

3. The process as claimed in claim 1, wherein the delayed coker fractionator outputs the heavy coker gas oil (HCGO) to provide necessary heat energy to melt the waste plastic feedstock and a cooler heavy coker gas oil (HCGO) stream is released from the preheating vessel.

4. The process as claimed in claim 1, wherein the pyrolysis provides the vapour component having value-added light olefins selected from ethylene, propylene, and a mixture thereof.

5. The process as claimed in claim 1, wherein during the condensation step the gases leave from a top portion of the separator tower and the condensed liquid leaves from a bottom portion of the separator tower.

6. The process as claimed in claim 1, wherein the pyrolysis oil stream is prepared from the waste plastic feedstock under process conditions having a temperature ranging from 250-550° C., a pressure is maintained at atmospheric pressure with holding time of 1-6 hours.

7. The process as claimed in claim 1 wherein the boiling point of the lighter cut is below 200° C., and the boiling point of the heavier cut is above 200° C.

8. The process as claimed in claim 1, further comprising mixing the pyrolysis oil stream with a bottom outlet stream of the delayed coker fractionator, wherein the bottom outlet stream comprises the hot heavy residual feedstock and the condensed recycle.

9. The process as claimed in claim 8, wherein the pyrolysis oil stream is mixed with the effluent from the coke drum, wherein the pyrolysis oil stream acts as a quench oil to terminate extra thermal cracking, to avoid coke formation, and to condense a heavy part of the effluent from the coke drum.

10. The process as claimed in claim 9, wherein the pyrolysis oil stream along with the effluent from the coke drum and the hot heavy residual feedstock are fed to the delayed coker fractionator to mix with the condensed recycle to produce the resulting mixture.

11. The process as claimed in claim 1, wherein the plurality of coke drums is operated under process conditions having a temperature 460-520° C., a pressure 1-3 Kg/cm$^2$ and at least 10 hours cycle time.

12. The process as claimed in claim 1, wherein the plurality of coke drums is operated in parallel to complete a coking cycle one after another, and the two-phase mixture is systematically passed into each of the plurality of coke drums through a control valve to facilitate the coking cycle in each of the plurality of coke drums.

13. The process as claimed in claim 12, wherein each of the plurality of coke drums produces the coke, the effluent, and the wash liquid, wherein the wash liquid is discharged into a blow down section, and the effluent from the coke drum is sent back to a bottom of the fractionator using a vapor transfer line.

* * * * *